Aug. 21, 1962 T. J. GRIFFEN ETAL 3,050,028
TRANSMISSION CONTROL INDICATOR MECHANISM
Filed March 7, 1960 2 Sheets-Sheet 1

INVENTORS
Thomas J. Griffen &
BY M. Morton Smith
Hugh L. Fisher
ATTORNEY

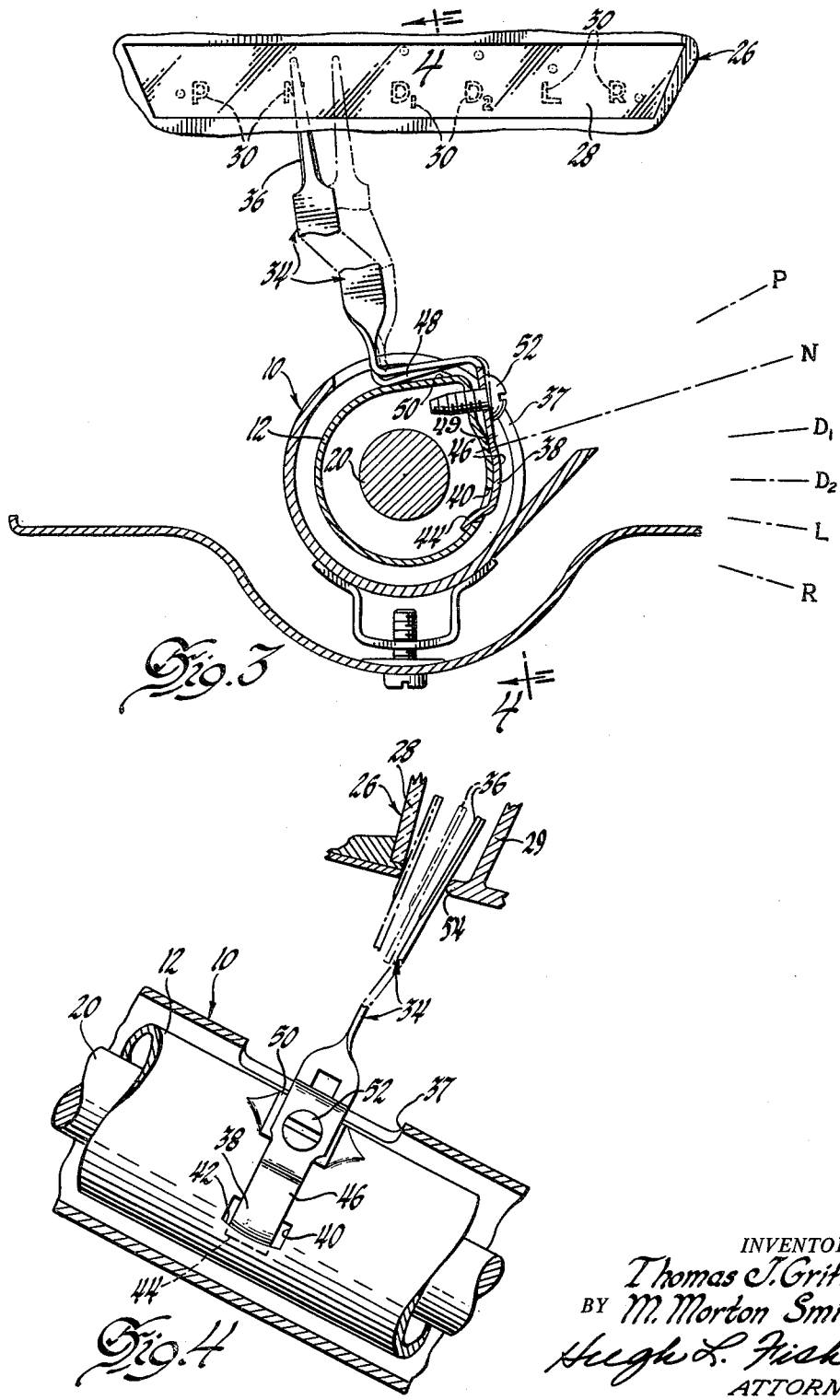

United States Patent Office 3,050,028
Patented Aug. 21, 1962

3,050,028
TRANSMISSION CONTROL INDICATOR
MECHANISM
Thomas J. Griffen, Dearborn, and M. Morton Smith, Orchard Lake, Mich., assignors to General Motors Corporation, Detroit, Mich., a corporation of Delaware
Filed Mar. 7, 1960, Ser. No. 13,046
5 Claims. (Cl. 116—124)

This invention relates generally to indicators for vehicles and more particularly to improvements in transmission control indicators of the type adapted, although not exclusively, for cooperation with a steering column mounted transmission control.

In general, it is desirable to have the various vehicle instruments: gas, oil, and temperature gages, speedometer, transmission control indicator, etc., mounted on the instrument panel within a compact, dust-free enclosure and in a convenient position for visual inspection by the operator. In this way the time during which the operator's attention is diverted from the road is minimized. But, when the transmission control indicator becomes a part of the instrument panel, although desirable, assembly does become a problem, for the instrument panel and the steering column mounted transmission control are usually installed separately, respectively to the vehicle body and to the vehicle chassis. Consequently, when the vehicle body is placed on the chassis at final assembly, the connection of the transmission control and the transmission control indicator as well as the proper alignment of the transmission control indicator with the dial housing legends must be made quickly. Additionally, the indicator should be relatively simple in structure and be suited for manufacture according to accepted mass production techniques.

With the foregoing in mind, the invention contemplates a transmission control indicator mechanism that employs a minimum number of simple components, each of which is conveniently fabricated according to accepted mass production techniques and easily and quickly installed, and that affords plural adjustments, each easily accomplished without resort to complexity, thus insuring accurate alignment.

More specifically, the invention seeks to provide a transmission control indicator mechanism that has the indicator member therefor secured directly to the transmission control and that in a novel way affords adjustments of the indicator member relative to legends on an instrument panel mounted dial housing and also, relative to the face of the dial, thereby facilitating installation and adjustment at final vehicle assembly.

The foregoing and other objects and advantages of the invention will be apparent from the following description and from the accompanying drawings in which:

FIGURE 3 is a sectional view of the indicator mechanism looking in the direction of the FIGURE 2 arrows 3—3; and FIGURE 4 is another sectional view of the transmission control indicator mechanism looking in the direction of arrows 4—4 in FIGURE 3.

Figure 1:
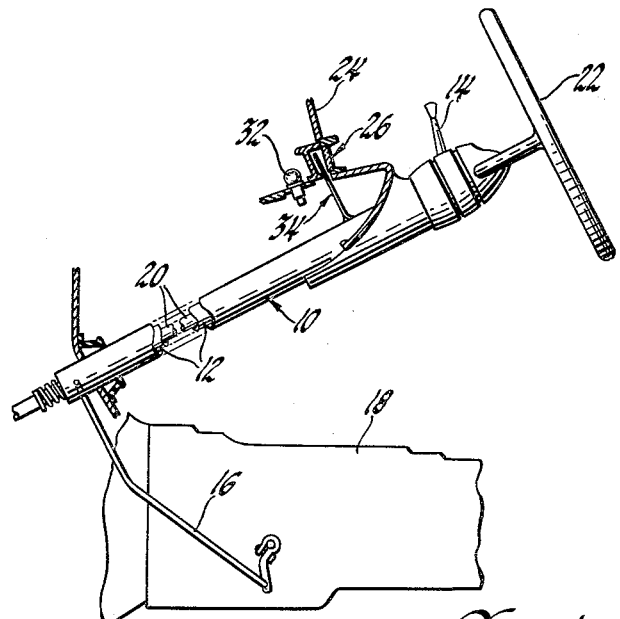
FIGURE 1 is a view demonstrating a transmission control indicator mechanism constructed according to the invention and its relationship to environmental structures.
Figure 2:
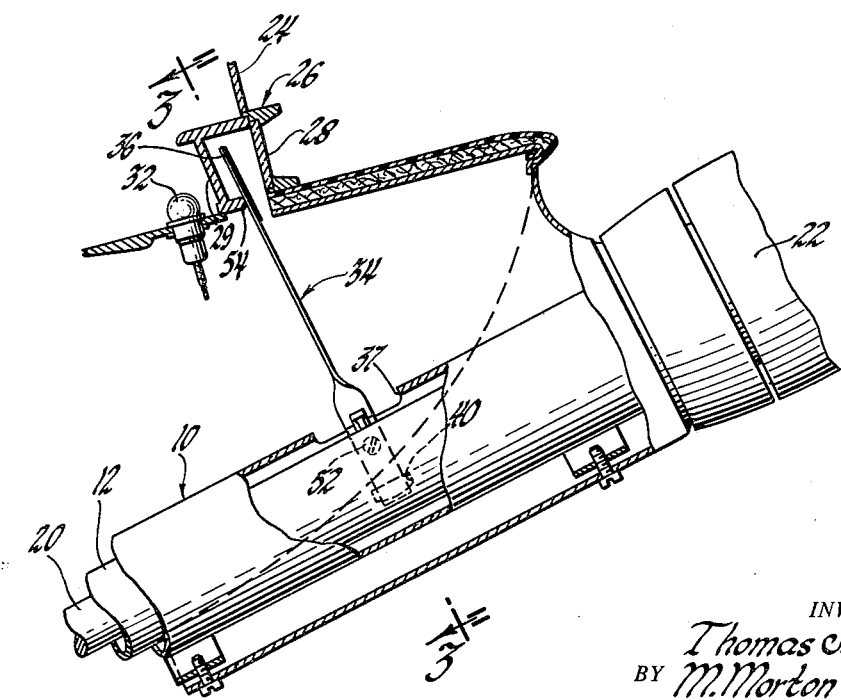
FIGURE 2 is an enlarged sectional view of the transmission control indicator mechanism viewed in FIGURE 1.

Referring now to the drawings in detail, and particularly to FIGURE 1, the numeral 10 denotes an appropriately mounted vehicle steering column in which is rotatably supported a tubular transmission control shaft 12. At the upper end of the transmission control shaft 12, a conventional shift lever 14 is attached, and at the lower end, connection is made through linkage 16 to a transmission 18. Rotation of the shift lever 14 by the operator will cause the transmission to be conditioned for different operating statuses in a way well-known by those versed in the art. Also revolvably supported within the steering column 10 and enclosed by the transmission control shaft 12 is a steering shaft 20. Steering shaft 20 at the lower end makes connection with the vehicle wheels (not shown) in the customary way and at the upper end has attached thereto a steering wheel 22. Steering is accomplished in the usual fashion.

Since it is necessary to advise the operator of each transmission setting, and also since it is desirable for the settings to be observable from a part of the instrument panel, in this embodiment the panel is denoted by the numeral 24, a dial housing 26 has been installed thereon in close proximity to the steering column 10. The dial housing 26 includes a front window 28 and a rear transparent prism 29 on which, as depicted in FIGURE 3, a series of legends 30 are imprinted, each indicating a different transmission status, e.g., in reading from left to right in FIGURE 3, Park, Neutral, Drive$_1$, Drive$_2$, Low, and Reverse and each being visible through the window 28. A lamp 32 in an appropriate way illuminates the prism 29 so as to advise the driver at night of the position of an indicator member 34 relative to the legends 30.

The normal procedure in the building of motor vehicles, as has been mentioned, is for the vehicle body including the instrument panel 24 and the dial housing 26 to be installed onto a vehicle chassis including the steering column 10 and transmission 18 at final assembly. Therefore, the indicator member 34, whether installed before or at final assembly, must be aligned after the vehicle body is in place so as to be certain that the indicator member 34 indicates the desired transmission setting and also so as to be located properly relative to the face of the prism 29.

The mode of accomplishing the foregoing can be best understood by considering FIGURES 3 and 4 where the transmission indicator member 34 is depicted with a pointer end 36 positioned adjacent the legends 30 and extending through a suitable opening 37 in the steering column 10 so as to permit an opposite retaining end 38 to be inserted within a guide slot 40 in the transmission control shaft 12. The bottom of the guide slot 40 (see FIGURE 4) is provided with an arcuate edge 42 so contoured as to receive the part of the retaining end 38 that is inturned as at 44. The inturned part 44 not only retains the indicator member 34 in position, but also prevents the retaining end 38 from moving further within the transmission control shaft 12. For support, the indicator member 34 is provided above the retaining end 38 with an arcuate guide surface 46 of the same contour as the periphery of the transmission control shaft 12. Just above the arcuate guide surface 46, the indicator member 34 is provided with a spring arm 48, which in this embodiment is formed by inwardly lancing a portion thereof so that the arm 48 is pivotable at a point 49 at the upper termination of surface 46 and engages a flat support surface 50 on the transmission control shaft 12. If preferred, the spring arm 48 can be a separate element and riveted or otherwise secured at the pivot end. The adjusted position of the indicator member 34 is maintained by an adjusting screw 52 threadedly joined to the transmission control shaft 12. The bias from the spring arm 48 opposes inward movement of the screw 52 and therefore functions somewhat as a lock washer in that unwanted rotation of the screw 52 due to vibrations, etc., is prevented. Additionally, the spring arm 48 permits a considerably greater range of adjustments to be made than would otherwise be possible.

Two modes of adjusting the position of the indicator member 34 are provided. Considering first the adjustment of the indicator member 34 relative to the legends 30 and referring to FIGURE 3, if the adjusting screw 52 is withdrawn or loosened, the bias from the spring arm 48 will cause flexure in the area of surface 46 and accordingly pivotal movement of the indicator member 34 about the retaining end 38. As a result, the indicator member 34 will be rotated in the plane of transmission control shaft rotation and from the solid line position to that portrayed by the broken lines. Conversely, if the screw 52 is rotated so as to move inwardly, the indicator member 34 will pivot about the retaining end 38 in the opposite direction but still in the plane of rotation of the transmission control shaft 12 and increase the tension on the spring arm 48. In this way, the transmission control shaft 12 can be placed in whatever setting is to be used at final assembly for adjustment purposes, e.g., Neutral, and the pointer end 36 maneuvered until opposite the corresponding legend N.

The other adjustment, demonstrated in FIGURE 4, permits maneuvering of the indicator member 34 within a plane that is substantially parallel to the longitudinal axis of the transmission control shaft 12 or transverse to the plane of rotation of shaft 12. This adjustment only requires that the indicator member 34 be swingably moved about the axis of the adjusting screw 52 and within the limits established by the width of the guide slot 40 in the transmission control shaft 12. The resultant swingable movement permits the indicator member 34 to be moved between the extreme broken line positions to a position against a guide portion 54 of prism 29, as shown by solid lines, thus permitting accurate location of the pointer end 36 relative to the faces of the dial housing window 28 and the prism 29. In this way, parallax distortion is minimized.

From the foregoing, it can be seen that the indicator member 34 is attached directly to the transmission control shaft 12 and that adjustments relative to both the dial legends and the dial face are allowed. Because of novel structures of the indicator member 34 and the transmission control shaft 12, there is no need for any additional parts. As a consequence, adjustment and/or installation at vehicle final assembly is facilitated. Also, the fabrication of the indicator member 34 and the transmission control shaft 12 can easily be accomplished and the indicator member 34 in particular is readily adaptable to manufacture as a stamping.

The invention is to be limited only by the following claims.

We claim:

1. In combination; an instrument panel for a vehicle; a steering column; a transmission control tube rotatably supported by the steering column for movement to a series of transmission control tube settings; the transmission control tube having a guide slot therein provided with an arcuate edge, a peripheral portion, and a substantially flat transmission control tube support surface formed thereon; a dial housing mounted on the instrument panel and having legends thereon corresponding to each of the transmission control tube settings; an indicator member for the dial housing; the indicator member including an arcuate guide surface in partial encircling engagement with the peripheral portion of the transmission control tube, an inturned end extending from the arcuate guide surface and constructed for reception within the guide slot, a pointer end opposite the inturned end, and a spring arm engageable with the transmission control tube support surface so as to afford a bias tending to pivot the indicator member about the inturned end thereof; the inturned end of the indicator member coacting with the arcuate edge of the guide slot so as to permit pivotal adjusting movement of the indicator member about the inturned end of the indicator member in the plane of rotation of the transmission control tube and thereby cause the pointer end to be maneuvered relative to the legends; and an adjusting screw threadedly attaching the indicator member to the transmission control tube at a point between the pointer end and the inturned end so as to maintain the selected setting thereof against the bias from the spring arm and so as to cause pivotal adjusting movement of the indicator member when the screw is adjusted, the adjusting screw forming the axis for swingable adjustable movement of the indicator member in a plane substantially parallel to the longitudinal axis of the transmission control tube and within limits determined by the guide slot.

2. In combination; an instrument panel for a vehicle; a steering column; a transmission control shaft rotatably supported by the steering column for movement to a series of transmission control settings; a dial housing mounted on the instrument panel and having legends thereon corresponding to each of the transmission control settings; an indicator member for the dial housing; the indicator member including a retaining end, a spring arm engageable with the transmission control shaft so as to afford a bias tending to pivot the indicator member about the retaining end thereof, and a pointer end adjacent the legends on the dial housing; the retaining end of the indicator member being joined directly to the transmission control shaft so as to permit pivotal adjusting movement of the indicator member about the retaining end and thereby cause the pointer end to be maneuvered relative to the legends on the dial housing; and an adjusting screw threadedly attaching the indicator member to the transmission control shaft at a point between the retaining end and the pointer end so as to maintain the selected setting of the indicator member against the bias from the spring arm and so as to cause pivotal adjusting movement of the indicator member when the screw is adjusted; the adjusting screw forming the axis for swingable movement of the indicator member in a plane transverse to the plane of rotation of the transmission control shaft.

3. In combination, an instrument panel for a vehicle; a steering column; a transmission control rotatably supported by the steering column for movement to a series of transmission control settings; a dial housing mounted on the instrument panel and having legends thereon corresponding to each of the transmission control settings; an indicator member for the dial housing; the indicator member having a retaining end joined directly to the transmission control and a pointer end disposed opposite the legends; an adjusting member for movably joining the indicator member directly to the transmission control between the pointer and retaining ends, the adjusting member and the indicator member being so arranged that adjustment of the adjusting member produces pivotal adjustment movement of the pointer end about the retaining end thereof and thereby cause the pointer end to be maneuvered relative to the legends; the indicator member also being swingable about the adjusting member so as to permit swingable adjusting movement of the pointer end relative to the face of the dial housing.

4. In combination, a steering column, a transmission control rotatably supported by the steering column for movement to a series of transmission control settings, a dial housing mounted adjacent the steering column and having legends thereon corresponding to each of the transmission control settings on a face thereof, an indicator member for the dial housing, and an adjusting member for joining the indicator member directly to the transmission control so as to permit adjusting movement thereof in plural planes substantially perpendicular to each other, movement in one plane adjusting disposition of the indicator member relative to the legends and movement in another plane adjusting disposition of the indicator member relative to the face of the dial housing, the adjusting member and the indicator member being so arranged that adjustment of the adjusting member will cause the movement in the one plane.

5. In a motor vehicle, the combination of a transmission control maneuverable to a series of transmission control settings, a dial housing mounted adjacent the transmission control and having legends thereon corresponding to each of the transmission control settings, an indicator member for the dial housing, and an adjusting member for securing the indicator member directly to the transmission control so as to permit both longitudinal and transverse adjustment relative to the transmission control, the adjusting member and the indicator member being so arranged that adjustment of the adjusting member will cause the transverse adjustment.

References Cited in the file of this patent
UNITED STATES PATENTS

| | | |
|---|---|---|
| 2,732,905 | Anderson | Jan. 31, 1956 |
| 2,869,506 | Grady | Jan. 20, 1959 |

UNITED STATES PATENT OFFICE

CERTIFICATE OF CORRECTION

Patent No. 3,050,028                            August 21, 1962

Thomas J. Griffen et al.

It is hereby certified that error appears in the above numbered patent requiring correction and that the said Letters Patent should read as corrected below.

Column 4, lines 54 and 55, for "adjustment" read -- adjusting --; line 58, for "adjusting" read -- adjustable --.

Signed and sealed this 1st day of January 1963.

(SEAL)
Attest:

ERNEST W. SWIDER
Attesting Officer

DAVID L. LADD
Commissioner of Patents